United States Patent [19]
Neal

[11] 3,815,651
[45] June 11, 1974

[54] REPLACEMENT TREAD AND METHOD

[75] Inventor: Duward Harding Neal, Muncie, Ind.

[73] Assignee: Tred-X Corporation, Muncil, Ind.

[22] Filed: July 13, 1972

[21] Appl. No.: 271,350

[52] U.S. Cl.................. 152/187, 152/172, 152/175
[51] Int. Cl. ............................................ B60c 11/02
[58] Field of Search..................... 152/172, 175, 187

[56] References Cited
UNITED STATES PATENTS

| | | | |
|---|---|---|---|
| 871,575 | 11/1907 | Dorgan | 152/187 |
| 1,330,855 | 2/1920 | Farr | 152/187 |
| 1,398,414 | 11/1921 | Brucker | 152/187 |
| 1,445,540 | 2/1923 | Mullikin | 152/187 |
| 1,707,014 | 3/1929 | Hopkinson | 152/187 |
| 1,954,926 | 4/1934 | Fraser | 152/187 |
| 2,707,014 | 4/1955 | Gramelspacher | 152/187 |
| 2,868,257 | 1/1959 | Redfearn | 152/187 |
| 3,224,483 | 12/1965 | Gross et al. | 152/187 |

Primary Examiner—Dayton E. Hoffman
Attorney, Agent, or Firm—Owen & Owen

[57] ABSTRACT

The invention is a replacement tread for installation on a tire casing and the method of installing the tread. The replacement tread includes an endless, premolded central tread portion having a relaxed diameter less than the inflated diameter of the tire casing. Integral shoulder wings extend downwardly from the central tread portion and define a circular bottom edge. The shoulder wings bias the bottom edges against the tire casing effecting a seal.

To install the replacement tread, the tread area of the tire casing is prepared and the tire casing inflated. The replacement tread is expanded and released onto the tire casing. Tension forces hold the replacement tread closely against the tire casing. The tread is stitched under pressure forces to remove entrapped air and to effect a flud seal etween the shoulder wings and the tire casing. Finally, the replacement tread and the tire casing assembly is cured or bonded.

2 Claims, 5 Drawing Figures

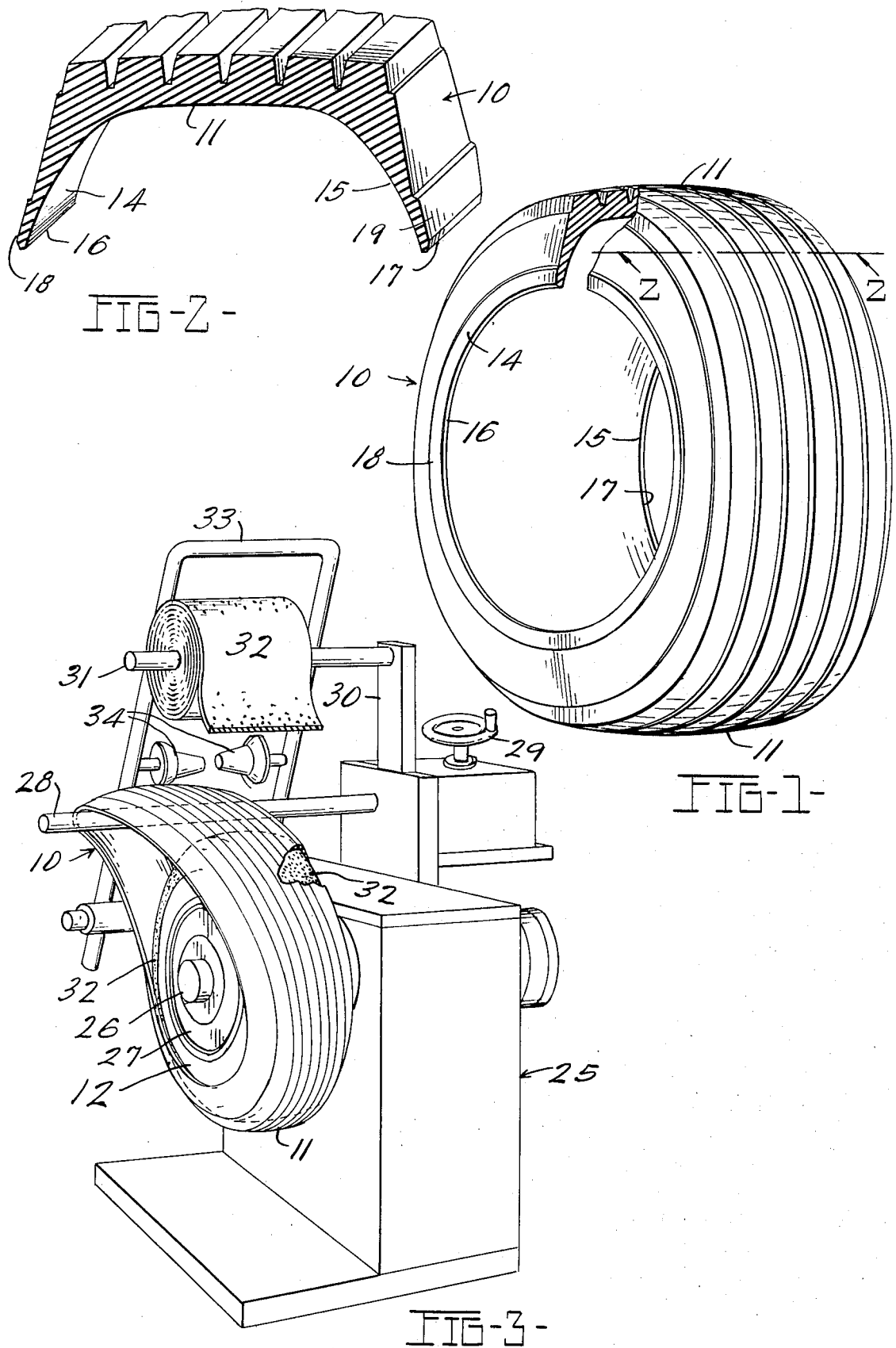

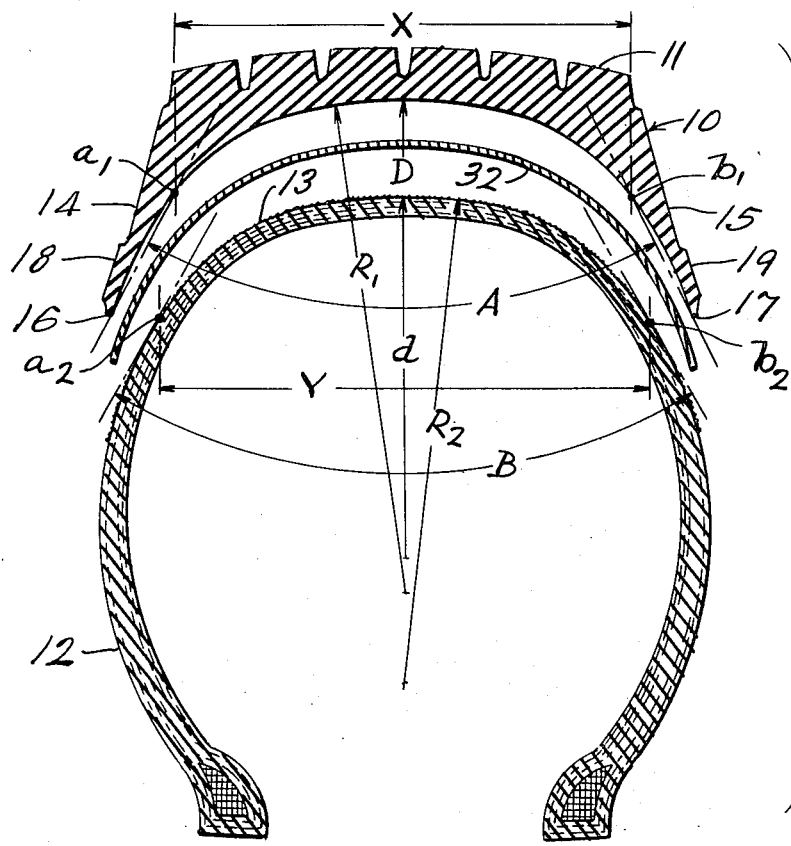
FIG-4-
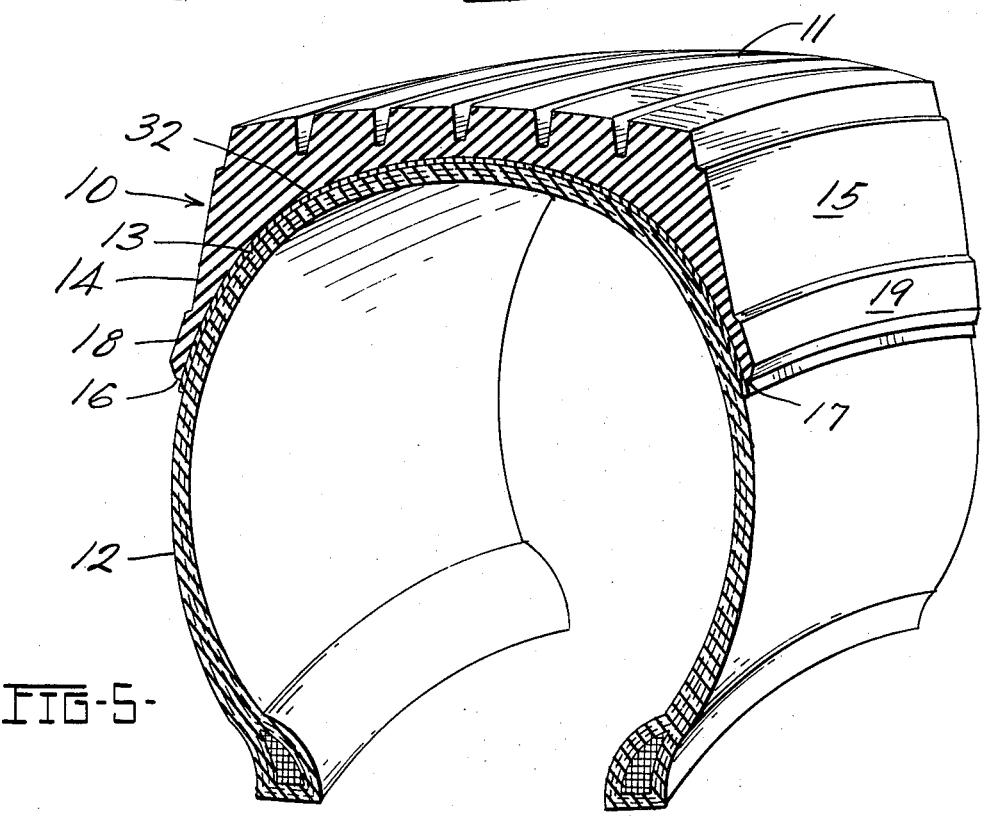
FIG-5-

REPLACEMENT TREAD AND METHOD

BACKGROUND OF THE INVENTION

The present invention relates to a replacement tread for automobile truck tires, aircraft and other pneumatic tires. Presently, retreaded tires are tested for high speed performance, endurance and impact, the latter being commonly referred to as plunger testing. Many retreaded tires fail under one or more of the present testing procedures. Many of these failures can be attributed to improper use of fixed matrices which unduly stress the retreaded tire and to a non-uniform massive buildup of rubber-like base stock which results in a heat buildup while a tire is in service.

Under a commonly used prior art retreading operation, fixed matrices or molds are utilized to mold the new tread design into uncured rubber which has been secured to a prepared tire casing. Subsequently, the assembly is vulcanized to cure the tread rubber and bond it to the tire casing.

Since the 1950's when nominal sizes of passenger tires were generally uniform in both construction, sectional configuration and tread widths, tire companies have begun to produce many sizes, sectional configurations and constructions of tires. In addition, the advent of belted tires and radial constructed tires and resulted in tire casings which are relatively inflexible. Therefore, to properly retread passenger tires using the still popular matrix system, numerous matrices must be purchased by a tire retreader in order to properly retread a tire. The use of a tire matrix which is noncompatible with a particular tire casing to be retreaded often results in the above-identified failures.

Another prior art method of retreading tires, particularly truck tires, has been the use of a precured tread which has its ends joined together to encircle a prepared tire casing. The entire assembly is then placed in a flexible envelope. Vulcanization is subsequently performed by placing the assembly in an autoclave under heat and pressure.

Considerable difficulties are encountered in such a method of retreading tires to positively prevent the entrance of air between the precured tread stock and the adjacent surface of the tire casing.

Another tread for recapping tires is disclosed in U.S. Pat. No. 3,283,795. A precured tread section having a bottom radius of curvature greater than the radius of curvature of the tire casing is applied to the tire casing. When a strip is placed around the tire casing, the end faces of the new tread material are abutted against each other. This patent also discloses the use of several segmented circular rings or integral annular members, which are joined together during the retreading of a single tire.

This type of sectional retread has been used on large truck and off the road tires.

SUMMARY OF THE INVENTION

The present invention relates to a replacement tread which is particularly adaptable for use in retreading passenger tires. The replacement tread includes an endless, premolded central tread portion having a relaxed diameter less than the inflated diameter of the tire casing. When installed, the replacement tread is stretched and "snaps" against the prepared tire casing and an intermediate layer of bonding material. Placing the replacement tread on the prepared tire casing under tension both on diameter and cross section is important from a performance standpoint. If the relaxed diameter and cross section of the tread is greater than the tire casing there would be separating forces generated during actual operation of the retreaded tire. Integral shoulder wings extend downwardly from the central portion of the replacement tread to a predetermined location between the tire casing tread area and the crown on the sidewall of the tire casing. The integral shoulder wings define a circular bottom edge which is biased inwardly against the tire casing to effect a seal. The premolded central tread portion of the replacement tread is lesser in width than the tread width of the tire casing. When installed, tension forces are present in the replacement tread, thereby insuring a close fit on the tire casing.

BRIEF DESCRIPTION OF THE DRAWINGS

FIG. 1 is a perspective view of a replacement tread according to the invention;

FIG. 2 is a partially diagrammatic, vertical cross-sectional view taken along the line 2—2 of FIG. 1;

FIG. 3 is a diagrammatic view showing the installation of a replacement tread, according to the invention, upon a prepared tire casing;

FIG. 4 is a diagrammatic sectional view showing a prepared tire casing, an intermediate bonding layer, and a replacement tread according to the present invention; and FIG. 5 is a diagrammatic sectional view showing the replacement tread after installation upon the tire casing.

DESCRIPTION OF THE PREFERRED EMBODIMENT

A replacement tread, according to the present invention, is generally indicated in FIG. 1 by the reference number 10. Referring to FIG. 2, the replacement tread 10 includes an endless, premolded central tread portion 11. The replacement tread 10 is constructed by molding and vulcanizing uncured stock as an endless belt or unit. However, the replacement tread 10 is relatively flexible and may be stretched as shown in FIG. 3. It should be noted that this is contrary to common prior art matrix retreading operation which utilizes uncured rubber, vulcanization taking place subsequent to the application of the uncured rubber to a prepared tire casing.

Referring to FIG. 4, a tire casing 12 is shown. The tire casing 12 has a tread area 13 which extends between the points identified as $a_2$ and $b_2$. Prior to retreading, the tread area 13 is prepared by mechanical buffing. In FIG. 4, the tire casing 12 is shown in its normal inflated condition. When in the inflated condition, the tire casing 12 has a predetermined inflated diameter indicated by $d$ and a predetermined inflated tread width indicated by Y, which represents the distance between $a_2$–$b_2$.

The central tread portion 11 of the replacement tread 10 has a relaxed diameter indicated by the reference D in FIG. 4 and a relaxed tread section width indicated by the reference X. The relaxed tread section width is defined by the distance between points $a_1$–$b_1$, as shown in FIG. 4. An important feature of the present invention is that the relaxed diameter D of the central tread portion 11 is less than the inflated diameter $d$ of the tire casing 12. Similarly, the relaxed tread section width X of the central tread portion 11 is less than the predetermined inflated tread width Y of the tire casing 12. The radius of curvature R-1 of the underside of the replacement tread 10 is substantially equal to the radius of curvature R-2 of the upper surface of the tire casing 12.

If tangent lines are drawn through the points $a_1$–$b_1$ they define an angle A.

Similarly, tangent lines drawn through $a_2$–$b_2$ define an angle B.

The angle A is always less than the angle B in the replacement tread according to the present invention.

When the replacement tread 10 is positioned over the tire casing 12, it is stretched as shown in FIG. 3. Referring to FIG. 4, after the stretching occurs and the endless replacement tread 10 is placed on the tire casing 12, the points $a_1$–$a_2$ and $b_1$–$b_2$ coincide. This places the replacement tread 10 in tension and the tension forces insure a very close fit with respect to the external periphery of the tire casing 12.

A pair of opposed, integral shoulder wings 14 and 15 extend downwardly from the central tread portion 11 of the replacement tread 10. The shoulder wing 14 has a bottom edge 16 and the shoulder wing 15 has a bottom edge 17. As shown in FIG. 1, the bottom edges 16 and 17 each define a circle. Referring to FIG. 5, after installation, the bottom edges 16 and 17 are spaced downwardly on the shoulder of the tire casing 12 relative to the tread portion of the tire casing 12 to a predetermined location between the tire casing tread area and the crown of the tire casing sidewall. The shoulder wings 14 and 15 bias the bottom edges 16 and 17 inwardly against the tire casing 12 to effect a seal with the tire casing 12. The relationship of the bottom edges 16 and 17 and the biasing forces applied to these edges, is an important feature of the present invention. Because a seal is effected by the replacement tread 10 relative to the tire casing 12, bonding can be performed in, for example, an autoclave without the necessity of placing the assembly in a bag or similar device. This feature saves much hand labor and also prevents the entrance of air under pressure between the replacement tread 10 and the tire casing 12 which was a substantial problem in many prior art retreading assemblies.

The replacement tread 10 may also include integral and circular protuberances 18 and 19 on the shoulder wings 14 and 15 adjacent the bottom edges 16 and 17. In the present embodiment, the protuberances 18 and 19 are in the configuration of annular rings, however, the particular configurations of the protuberances may vary.

As mentioned above, the replacement tread 10 is initially molded in a full circle mold to a predetermined diameter. After vulcanization, the replacement treads 10 are ready to be installed on the prepared tire casing 12. Referring to FIG. 3, a tread applying machine 25 includes a horizontal shaft 26 which mounts a rim assembly 27. The machine 25 includes a retractable arm 28 which is mounted on an axis parallel to the shaft 26. The arm is retracted by rotating a hand wheel 29 which is geared to the retractable arm 28. The machine 25 also includes a bracket 30, which mounts a support rod 31. The rod 31 receives and supports a roll of cushion gum 32. A frame 33 is pivotally attached to the machine 25 and mounts a pair of centering and pressure rolls 34. The tread applying machine 25 is shown for illustrative purposes only and does not constitute a part of the present invention.

To apply a replacement tread 10 to a tire casing 12, the tire casing 12 is initially inspected and the tread area is mechanically buffed. The tire casing 12 is mounted on the rim assembly 27 and the tire is inflated to its normal road pressure, approximately 22 p.s.i. A bonding agent, for example a rubber vulcanizing cement, is then applied to the area to be fitted with the replacement tread 10. A strip layer of material is taken from the cushion gum roll 32 and applied around the circumference of the prepared tire casing 12. A replacement tread 10 of the proper size is then stretched over the tire casing 12 and strip layer of cushion gum, as shown in FIG. 3. The stretching is necessary because, as pointed out above, the replacement tread 10 is of lesser diameter and width than is the diameter and width of the tire casing 12. The arm 28 is then retracted and the frame 33 pivoted toward the replacement tread 10. The rolls 34 are moved into engagement and initially center the tread 10 on the tire casing 12. The rolls 34 are urged under pressure against the replacement tread 10. This rolls or stitches the replacement tread 10 to the tire casing 12. The pressure exerted by the rolls 34 is sufficient to create a temporary bond. The rolling also eliminates trapped air from between the mating surfaces. It is also important that the shoulder wings 14 and 15 of the replacement tread 10 be thoroughly rolled or stitched to the prepared tire casing 12. This seals the bottom edges 16 and 17 of the replacement tread 10 to the tire casing 12. The seal of the replacement tread 10 to the prepared tire casing 12 eliminates the possibility of air or steam penetrating the bonding area during the subsequent bonding process.

To accomplish bonding, the tire is inflated to a pressure approaching 125 p.s.i. If desired, the tire may be inflated with steam or heated air to accelerate the vulcanization of the bonding materials. The assembly is then placed in an autoclave and the internal pressure of the autoclave is raised to approximately 100 p.s.i. The temperature of the autoclave is raised to between 200°F. and 400°F. depending on the bonding agents used. The assembly remains in the autoclave until vulcanization has been completed. This time period may be as low as 15 minutes. The retreaded tire is then removed and is ready for road service.

The final retreaded tire, as shown in FIG. 5, has a pleasing appearance and is readily marketable. The uniform positioning of the treads and the uniform location of the bottom edges 16 and 17 of the replacement tread 10 insure a tire havng a satisfactory exterior appearance. In addition, because the tread is installed on an inflated tire casing the replacement tread and the tire casing are closely mated to one another irrespective of differences in size and configuration in nominal tire sizes which occur when the tire casings are produced by different tire manufacturers. This solves the prior art problem of buckling. It has been found that a replacement tread 10, according to the present invention, provided a much improved final product compared to products produced by many prior art retreading operations.

What I claim is:

1. A replacement tread for installation on a prepared pneumatic tire casing, such tire casing when in a maximum expanded condition having a maximum diameter and a maximum cross section, said replacement tread comprising, in combination, an endless, flexible, premolded and vulcanized central tread portion having a relaxed diameter less than such maximum diameter of such tire casing and having a pair of opposed and depending vulcanized integral shoulder wings extending downwardly from said central tread portion, each of said shoulder wings having a bottom edge which defines a circle spaced downwardly on the shoulder of such tire casing with respect to the tread portion of such tire casing, said central tread portion and said shoulder wings when in the relaxed condition having a cross-sectional dimension less than the corresponding maximum cross-sectional dimension of such tire casing, said replacement tread being stretched when installed on such tire casing, whereby the entire contacting surface of said replacement tread is placed under tension, said shoulder wings biasing said bottom edges inwardly against such tire casing to effect a seal with such tire casing, said replacement tread having its entire underside in contacting relationship with the adjacent surface of such tire casing.

2. A replacement tread, according to claim 1, including an integral and circular protuberance on each of said shoulder wings adjacent said bottom edge.

* * * * *

UNITED STATES PATENT OFFICE
CERTIFICATE OF CORRECTION

Patent No. 3,815,651　　　　　Dated June 11, 1974

Inventor(s) Duward Harding Neal

It is certified that error appears in the above-identified patent and that said Letters Patent are hereby corrected as shown below:

Assignee information should be corrected to read "Tred-X Corporation, Muncie, Ind.".

Abstract, paragraph 2, line 4, "t read" should be corrected to read "tread"; and line 7, "flud seal etween" should be corrected to read "fluid seal between".

Column 1, line 26, "and", second occurrence, should be corrected to read "has".

Column 2, line 44, between "to" and "common", "the" should be inserted.

Column 4, line 4, after "tire", "casing 12" should be inserted.

Signed and sealed this 1st day of October 1974.

(SEAL)
Attest:

McCOY M. GIBSON JR.
Attesting Officer

C. MARSHALL DANN
Commissioner of Patents